MULTI-STABLE FERRORESONANT CIRCUIT

Filed Feb. 27, 1963 2 Sheets-Sheet 1

WITNESSES
Leon J. Faya
Leon M. Garman

INVENTORS
Theodore Hamburger and
June E. Painter
BY Ernest P. Klipfel
ATTORNEY 3,313,948
Patented Apr. 11, 1967

3,313,948

MULTI-STABLE FERRORESONANT CIRCUIT

Theodore Hamburger, Baltimore, Md., and June E. Painter, Dayton, Ohio, assignors to Westinghouse Electric Corporation, Pittsburgh, Pa., a corporation of Pennsylvania Filed Feb. 27, 1963, Ser. No. 261,379
7 Claims. (Cl. 307—88)

The present invention relates to multi-stable switching devices, and more particularly to multi-stable switching devices, utilizing ferroresonant circuits.

These are a vast number of switching and logic circuits which are operative in two stable states. Such circuits form the modular elements upon which computer and other control systems are built. Having two stable states, the elements function as desired with input information being transmitted to and between elements in binary number form. For many applications, two stable states of operation provide all of the requirements of the system. However, in many other applications, it is desirable and often necessary that three stable states of operation be provided by the modular elements for various logic or control purposes.

A ferroresonant circuit includes a non-linear inductive element and a linear capacitive element. It is known that such a circuit has a steady state current versus voltage characteristic of such a shape that it is operative in two stable states. If the current versus voltage characteristic of the ferroresonant circuit could be modified in such a manner as to provide three stable states of operation, a multi-state switching element could be provided.

It is, therefore, an object of the present invention to provide a new and improved ferroresonant switching circuit having at least three stable states of operation.

It is a further object of the present invention to provide a new and improved multi-stable ferroresonant device having three stable states, which are readily distinguishable, and one of which has a subharmonic frequency of one half of the activating frequency of the ferroresonant circuit.

Broadly, the present invention provides a multi-stable device in which the non-linearity of the inductive element of a ferroresonant circuit is modified such that the current versus voltage characteristic of the ferroresonant circuit provides at least three stable states of operation.

These and other objects of the present invention will become more apparent when considered in view of the following specification and drawings, in which.

Figure 1A:
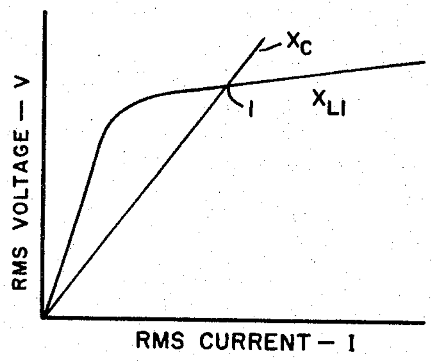
FIG. 1A is a plot of voltage versus current for a non-linear inductive element and for a linear capacitive element.
Figure 1B:
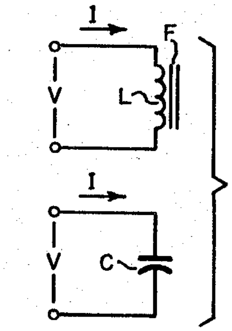
FIG. 1B is a schematic diagram of the inductive and capactive circuits to give the plot of FIG. 1A.

Referring the FIGS. 1A and 1B, if an inductor L, having a ferromagnetic core F, has applied thereto an excitation voltage having a root mean square (R.M.S.) voltage V and R.M.S. current I will pass through the inductive coil L. If the core member F of the inductor L is so selected to be driven into saturation by the application of such voltage and current, the inductance of the inductor L will be non-linear, that is, the voltage across the inductor will not be directly proportional to the current passing therethrough. A plot of the R.M.S. voltage V as a function of the R.M.S. current I is shown in FIG. 1A, with the slope of the curve $X_{L1}$ being the inductive reactances of the inductor L. In the other circuit of FIG. 1B, a linear capacitor C is excited by an R.M.S. voltage V, and has the voltage versus current characteristic as shown in curve $X_C$ of FIG. 1A. The slope of the curve $X_C$ is constant since the capacitor C is linear. The non-linear inductive reactance curve $X_{L1}$ intersects the linear capacitive reactance curve $X_C$ at the point 1. Under such conditions, with the frequency of the exciting voltage being selected so that the curves $X_C$ and $X_{L1}$ intersect, a ferroresonant circuit can be obtained by connecting the inductive element L and the capacitive element C in series.

Figure 2A:
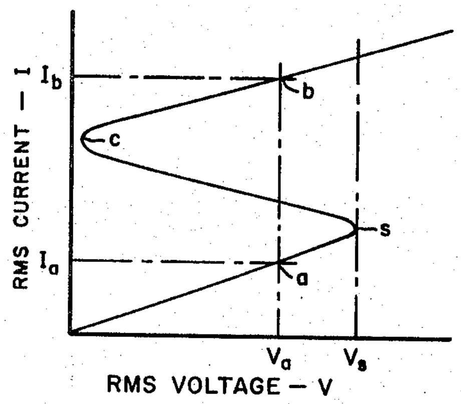
FIG. 2A is a plot of the current versus voltage characteristic of a ferroresonant circuit.
Figure 2B:
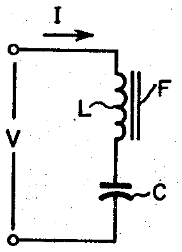
FIG. 2B is a schematic diagram of a series connected ferroresonant circuit having the characteristics plotted in FIG. 2A.

This series connection is shown in FIG. 2B with the voltage V being applied across the series combination and the current I passing through both elements. The current versus voltage characteristic of the circuit of FIG. 2B is shown in FIG. 2A and is derived from FIG. 1A as follows. Since the voltage across the inductor L is 180° out of phase with that of the capacitor C, for a given current, the voltage across the two elements in series is the difference between the ordinates of the plot of FIG. 1A. The differences in voltages are then plotted for various values of current.

The preceding serves as an introduction to explain the bistable operation that may be attained with a ferroresonant circuit as shown in FIG. 2B. Assume that the ferroresonant circuit is operative at point *a* of the plot of FIG. 2A being excited by an R.M.S. voltage $Va$ and at a current $Ia$. If it is desired to switch the circuit to the state *b*, this may be accomplished by temporarily increasing the R.M.S. voltage V above the value $Vs$. The device then will switch to the point *b*, at a current $Ib$ with the voltage returning to the original level $Va$. Once the voltage momentarily exceeds the voltage $Vs$, the device will go into its unstable region between the points *s* and *c* with the current then increasing to the current $Ib$ to satisfy the curve at the voltage $Va$. Thus, it is only necessary to momentarily increase the excitation voltage to have an R.M.S. value above $Vs$ to switch from state *a* to state *b*. On the other hand, to switch the circuit from state *b* to state *a*, the excitation voltage is reduced to zero and then the R.M.S. voltage $Va$ is reapplied to return the current to the state *a* level $Ia$.

The non-linearity of the inductor L is due to the core F being driven into saturation, that is, the core is driven into the region of its B-H loop of the material where a small increase in voltage applied to the inductor coil will drive a large amount of current through the coil. Material of this core should be of a saturable magnetic or ferromagnetic type. The core may have an air gap placed therein so that the voltage of saturation by suitable excitation voltages and currents may be more easily controlled.

Figure 3A:
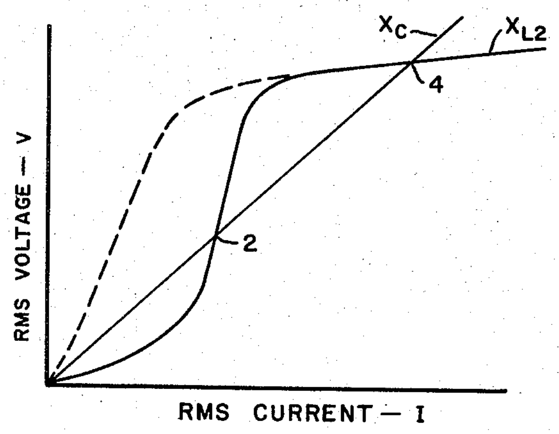
FIG. 3A shows a plot of voltage versus current for a non-linear inductive element as modified by a D.C. biasing current and for a linear capacitive element.
Figure 3B:
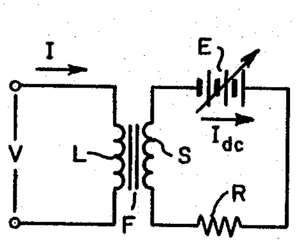
FIG. 3B is a schematic diagram of a circuit giving the non-linear inductive characteristic as shown in FIG. 3A.

Referring to FIG. 3A, the voltage versus current characteristic of a non-linear inductive element is shown as modified by applying a D.C. bias current through a coil to the core of the inductive element. A circuit to provide such a characteristic as shown in curve $X_{L2}$ of FIG. 3A is illustrated in FIG. 3B. There, the inductor L is excited by an R.M.S. voltage V with the R.M.S. current I passing therethrough. A coil S is also disposed around or with respect to the core F of the inductive element L, which has connected thereto a source of direct potential E which is in turn connected to the current limiting resistor R to complete the biasing current. A D.C. current $I_{dc}$ then flows through the coil S to provide a biasing M.M.F. to the core of the inductor L. Without the application of the D.C. bias current $I_{dc}$, the voltage versus current characteristic of the inductor L is shown by the dotted curve of FIG. 3A. However, by the application of the D.C. bias, the curve $X_{L2}$ of the inductor L is changed as shown with the low voltage and current portions of this curve requiring only a small increase in R.M.S. voltage to have a substantial increase in R.M.S. current. The curve $X_{L2}$ next has a linear portion, where the inductance of the inductor L is substantially constant. Then, the curve has a saturated portion with a large increase of current resulting from a small increase of voltage when the core F of the inductor L goes into saturation. The curve $X_{L2}$ follows the $X_{L1}$ curve of FIG. 1A, without the D.C. bias. The voltage versus current characteristic of the linear capacitor is still a straight line as shown in FIG. 3A as curve $X_C$. It should be noted that the curve $X_C$ now intersects the non-linear inductive reactance curve $X_{L2}$ at two points, 2 and 4. In the plot FIG. 1A, the curve only intersected at one point 1. The operating frequency of the applied excitation voltage should be such that there are intersections of the inductive reactance curve $X_{L2}$ with the capacitive reactance curve $X_c$, for example, at point 4. The D.C. bias current is so selected through the adjustment of the battery E or the resistor R that the inductive reactance curve $X_{L2}$ will be so modified that there will be an intersection at some point along the capacitive reactance curve such as at point 2 of FIG. 3A. Under these conditions there will be two intersections at points 2 and 4 as desired.

Figure 4A:
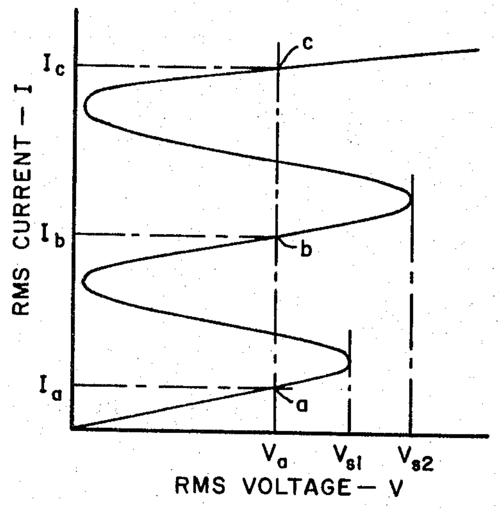
FIG. 4A is a plot of current versus voltage characteristic of a multi-stable device having three stable states of operation.

The current versus voltage characteristic shown in FIG. 4A is derived in the same manner as the current versus voltage characteristic of FIG. 2A was derived from the curves of FIG. 1A. Thus, by adding the ordinates of the inductive reactance and capacitor reactance curves of FIG. 3A, the plot of FIG. 4A is obtained.

Figure 4B:
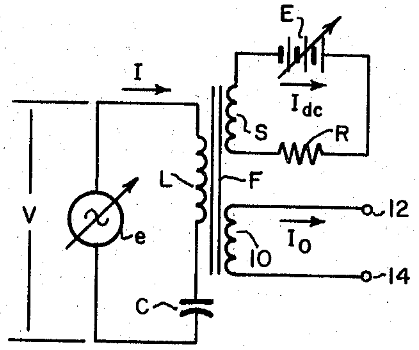
FIG. 4B is a schematic diagram of the multi-stable ferroresonant device of the present invention.

The circuit for providing the current versus voltage characteristic of FIG. 4A is shown in FIG. 4B. This figure shows a non-linear inductive element L connected in series with a linear capacitive element C. Connected across this series combination is an alternating excitation voltage source *e*, which has an R.M.S. voltage V and so drives an R.M.S. current I through the inductor L and capacitor C. The inductor L has a core member F associated therewith, which may be driven into saturation at predetermined times due to the voltage and current applied thereto. Disposed in relation to the core F is the bias coil S which has connected thereto the battery E and the resistor R to complete the biasing circuit for this arrangement. The magnitude of the current $I_{dc}$ generated in the biasing circuit may be controlled by adjusting the value of the battery potential. Also disposed in relation to the core member F is the output coil 10. Because of this arrangement, any change in the input current I will be detected in the coil 10 to generate an output current $I_0$ which may be detected at the terminals 12 and 14 by a suitable load circuit, not shown.

The operation of the circuit of FIG. 4B can be seen with reference to FIG. 4A. Assuming that the ferroresonant circuit including the inductor L and the capacitor C are energized so that the R.M.S. value of the voltage is $V_a$ and the R.M.S. value of the current is $I_a$, the circuit will be operative in its low state shown at point *a* on the curve of FIG. 4A. In order to switch the circuit from state *a* to state *b*, the middle state, the value of the voltage must be increased above the value $V_{s1}$. This may be accomplished either by increasing the value of the excitation voltage *e* so that it will have an R.M.S. value larger than $V_{s1}$, or by increasing the biasing current so that the capacitive reactance curve of FIG. 3A will be so modified to allow the existing R.M.S. value of voltage to be sufficient to switch to the middle state of operation *b*. After the switching action has occurred, reapplying the voltage $V_a$, the ferroresonant circuit will then be operating still at the voltage $V_a$ but at the higher, middle state current $I_b$. If now it is desired to switch from state *b* to state *c*, the excitation voltage must now be increased above the voltage $V_{s2}$. If this is done, then the circuit will switch to the point *c* on the curve of FIG. 4A at a current $I_c$, which is the high state of operation of the ferroresonant circuit. The switching action may also occur by changing the D.C. bias current, as explained above.

If it is desired to switch from point *c* to point *a*, the excitation voltage may be reduced to zero and then the voltage $V_a$ reapplied, which will place the ferroresonant circuit in operation at point *a*. If it is desired to switch to point *b* from state *c*, the circuit may be first switched to state *a*, and then from state *a* to state *b* in the manner described above.

Figure 5:
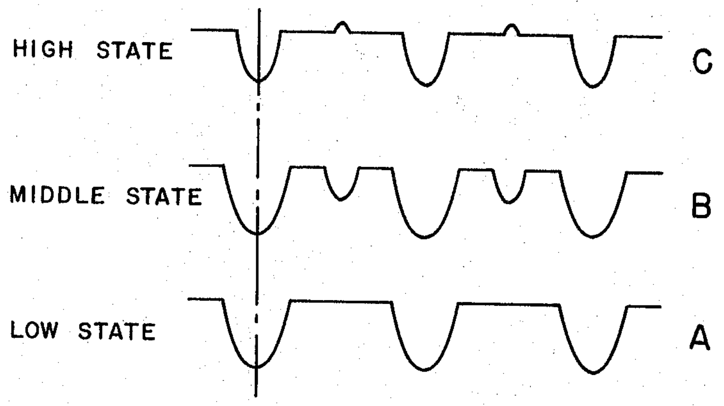
FIG. 5 is a plot of wave forms of the output signals from the multi-stable ferroresonant device of FIG. 4B.

The output wave forms are shown in FIG. 5. These wave forms may be detected across the terminals 12 and 14 of the coil 10 of FIG. 4B or across the linear capacitor C in series with L. Curve A of FIG. 5 shows the output wave form when the ferroresonant circuit is in the state *a*. The frequency content of this wave form is primarily of the same frequency as the input energizing voltage *e*. However, there are some harmonics present. Curve B of FIG. 5 shows the middle state of operation at point *b* of FIG. 4A. This wave form has subharmonic frequency of one-half the excitation frequency besides the fundamental frequency. The frequency content in the middle state *b* being such, this state may be used for frequency division applications. Curve C of FIG. 5 shows the output wave form when the ferroresonant circuit is in its high state *c*. The primary frequency content of this wave form is of the same frequency as the excitation wave form. A substantial amount of harmonics are also present. The frequency content of these wave forms has been determined from experimental data since due to the non-linear phenomena involved in the circuitry, it is difficult to predict results from conventional analysis.

Figure 6:
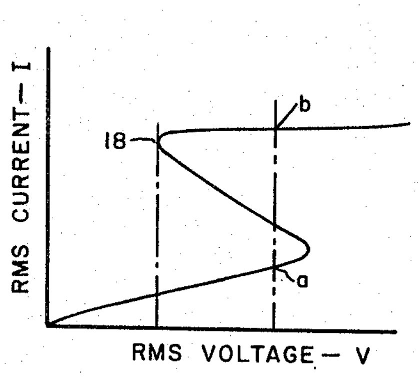
FIG. 6 is a plot of the current versus voltage characteristic of a bistable ferroresonant device where losses are included.

The current versus voltage characteristics given by the plots of FIGS. 2A and 4A are idealized characteristics in that losses due to various causes have been neglected. FIG. 6 shows a plot of the current versus voltage characteristic for bistable operation in which losses have been taken into account. The curve of FIG. 6 shows that the knee 18 between the two stable states *a* and *b* does not go back to the zero voltage level. This is due to losses from hysteresis, eddy currents, ordinary IR losses in the inductive component, capacitative component and power sources. However, it should be noted that this distortion from the theoretical curve does not affect operation in that the curve is sufficiently non-linear to enable the curcuit to operate effectively in two stable states.

Figure 7:
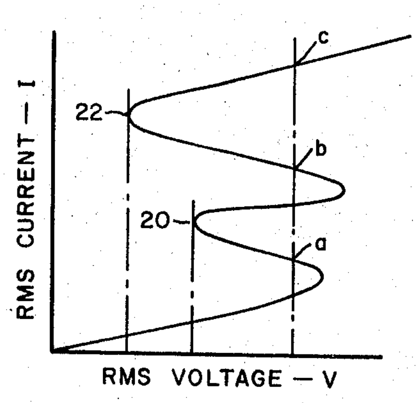
FIG. 7 is a plot of the current versus voltage characteristic of a multi-stable ferroresonant device where losses are included.

FIG. 7 shows a plot of the current versus voltage characteristic including losses for a ferroresonant circuit operative in three stable states. It should be noted that the two knees 20 and 22 do not go back to a zero voltage condition as differentiated from the theoretical plot of FIG. 4A. Nonetheless, the circuit will still operate in three stable manners in that the curve is sufficiently non-linear to permit operation at the points *a*, *b* and *c* without instability even under the effects of energy losses from various factors as mentioned above in reference to FIG. 6.

Although the present invention has been described with a certain degree of particularity, it should be understood that the present disclosure has been made only by way of example and that numerous changes in the details of circuitry in the combination and arrangement of parts, elements and components may be restored to without departing from the scope and the spirit of the present invention.

We claim as our invention:

1. A multi-stable switching device operative with a source of potential comprising, a ferroresonant circuit including a non-linear inductive element, and a capacitive element serially connected to said inductive element, said ferroresonant circuit being energized by the source of potential connected across the series connection of said inductive and capacitive elements; biasing means operative to alter the non-linearity of said inductive element so that said ferroresonant circuit has a current versus voltage characteristic providing at least three stable states of operation; control means operative to switch said ferroresonant circuit to its various stable states of operation; and output means operative to provide output signals indicative of the particular stable state of operation.

2. A multi-stable switching device operative with a source of potential comprising, a ferroresonant circuit including a core member comprising a saturable magnetic material and an inductive coil disposed with respect to said core member to provide a non-linear inductive element, and a capacitive element serially connected to said inductive element, said ferroresonant circuit being energized by the source of potential connected across the series connection of said inductive and capacitive elements; biasing means including a coil disposed with respect to said core member and being operative to alter the non-linearity of said inductive element so that said ferroresonant circuit has a current versus voltage characteristic providing at least three stable states of operation; control means operative to switch said ferroresonant circuit to its various stable states of operation; and output means to provide output signals indicative of the particular stable state of operation.

3. A multi-stable ferroresonant device operative with a source of potential comprising, a ferroresonant circuit including a non-linear inductive element and a capacitive element, serially connected to said inductive element, said ferroresonant vircuit being energized by the source of potential connected across the series connection of said inductive and capacitive elements; biasing means operative to alter the non-linearity of said inductive element so that said ferroresonant circuit has a current versus voltage characteristic providing at least three stable states of operation; control means operative to switch said ferroresonant circuit to its various stable states of operation by temporarily altering the voltage applied thereacross and output means to provide output signals indicative of the particular stable state of operation.

4. A multi-stable switching device operative with a source of potential comprising, a ferroresonant circuit including a core member comprising a saturable magnetic material, an inductive coil disposed with respect to said core member to provide a non-linear inductive element, and a capacitive element serially connected to said inductive coil, the series connection of said inductive coil and said capacitive element of said ferroresonant circuit being connected across the source of potential; biasing means including a coil disposced with respect to said core member and being operative to alter the non-linearity of said inductive element so that said ferroresonant circuit has a current versus voltage characteristic providing at least three stable states of operation; control means operative to switch said ferroresonant circuit to its various stable states of operation by temperarily altering the voltage applied thereacross; and output means to provide output signals indicative of the particular stable state of operation.

5. A multi-stable ferroresonant device operative with a source of potential comprising, a ferroresonant circuit including a core member comprising a saturable magnetic material, an inductive coil disposed about said core member to provide a non-linear inductive element, and a capacitive element connected in series with said inductive coil, the series connection of said inductive coil and said capacitive element of said ferroresonant circuit being connected across the source of potential; biasing means including a coil disposed about said core member and being operative to alter the non-linearity of said inductive element so that said ferroresonant circuit has a current versus voltage characteristic providing at least three stable states of operation; control means operative to switch said ferroresonant circuit to its various stable states of operation by temporarily altering the voltage applied thereacross; and an output coil disposed about said core member to provide output signals indicative of the particular stable state of operation of said ferroresonant circuit.

6. A multi-stable ferroresonant device operative with a source of alternating potential comprising, a ferroresonant circuit including a core member comprising a saturable magnetic material, an inductive coil disposed about said core member to provide a non-linear inductive element, and a capacitive element conncted in series with said inductive coil, the series connection of said inductive coil and said capacitive element of said ferroresonant circuit being operatively connected across the source of potential; biasing means including a biasing coil disposed about said core member and energizing means to apply a unidirectional current to said biasing coil, said biasing means being operative to alter the non-linearity of said inductive element so that said ferroresonant circuit has a current versus voltage characteristic providing three stable states of operation; control means operative to switch said ferroresonant circuit to its various stable states of operation by temporarily altering the voltage applied thereacross; and an output coil disposed about said core member to provide output signals indicative of the particular stable state of operation of said ferroresonant circuit.

7. A multi-stable ferroresonant device operative with a source of alternating potential having a predetermined frequency comprising, a ferroresonant circuit including a core member comprising a saturable magnetic material, an inductive coil disposed about said core member to provide a non-linear inductive element, and a capacitive element connected in series with said inductive coil, the series connection of said inductive coil and said capacitive element of said ferroresonant circuit being operatively connected across the source of potential; biasing means including a biasing coil disposed about said core member and energizing means to apply a current to said biasing means, said biasing means being operative to alter the non-linearity of said inductive element so that said ferroresonant circuit has a current versus voltage characteristic providing three stable states of operation; control means operative to switch said ferroresonant circuit to its various stable states of operation by temporarily altering the voltage applied thereacross; and output means operative to provide output signals indicative of the particular stable state of operation of said ferroresonant circuit, said output signals having a frequency component of one half of the predetermined frequency of the source of potential and harmonic multiples of ½ the frequency source of potential.

(References on following page)

References Cited by the Examiner

UNITED STATES PATENTS

| | | | |
|---|---|---|---|
| 2,838,687 | 6/1958 | Clary | 307—88 |
| 3,056,039 | 9/1962 | Onyshkevych | 307—88 |
| 3,065,357 | 11/1962 | McMillan | 307—88 |
| 3,113,216 | 12/1963 | Nyberg | 307—88 |
| 3,134,910 | 5/1964 | Bassett | 307—88 |
| 3,196,413 | 7/1965 | Teig | 340—174 |

BERNARD KONICK, *Primary Examiner.*

M. S. GITTES, *Assistant Examiner.*